United States Patent [19]

Kuschmierz et al.

[11] 4,432,228
[45] Feb. 21, 1984

[54] FUEL INJECTION ARRANGEMENT

[75] Inventors: Heinz Kuschmierz, Gerlingen; Wilhelm Vogel, Stuttgart, both of Fed. Rep. of Germany

[73] Assignee: Robert Bosch GmbH, Stuttgart, Fed. Rep. of Germany

[21] Appl. No.: 338,566

[22] Filed: Jan. 11, 1982

[30] Foreign Application Priority Data

Jan. 22, 1981 [DE] Fed. Rep. of Germany ....... 3101902
Mar. 25, 1981 [DE] Fed. Rep. of Germany ....... 3111669
Oct. 22, 1981 [DE] Fed. Rep. of Germany ....... 3141899

[51] Int. Cl.³ .......................................... G01M 15/00
[52] U.S. Cl. .............................. 73/119 A; 73/861.61; 310/338
[58] Field of Search ........... 73/861.61, 861.62, 861.48, 73/861.47, 119 A; 310/338; 123/448, 452

[56] References Cited

U.S. PATENT DOCUMENTS 4,046,004 9/1977 Iwasaki et al. .................... 73/119 A
4,361,050 11/1982 Coussot et al. .............. 73/861.61 X Primary Examiner—Jerry W. Myracle
Attorney, Agent, or Firm—Michael J. Striker

[57] ABSTRACT

A fuel injection arrangement for an internal combustion engine, has a control device for receiving an electrical signal corresponding to a quantity of applied fuel, comparing an actual value with a nominal value of the supplied fuel quantity, and producing a correcting signal for fuel supply, and also has a measuring element for measuring the quantity of the supplied fuel and producing the responding electrical signal, wherein the measuring element includes a quartz pressure measuring diaphragm producing the electrical signal by a piezoelectric effect on quartz because of a differential pressure on the measuring diaphragm.

12 Claims, 3 Drawing Figures

FUEL INJECTION ARRANGEMENT

BACKGROUND OF THE INVENTION

The present invention relates to a fuel injection arrangement. More particularly, it relates to a fuel injection arrangement which has a measuring element for measuring a supplied quantity of fuel and producing an electrical signal, and a control device which receives this electrical signal, compares it with a nominal value and produces a correcting signal for supplying a proper quantity of fuel.

Arrangements of the above mentioned general type are known in the art. A known fuel injection arrangement includes a measuring element formed by volumetric motors with rotors introduced into an electric circuit, and detecting elements arranged to detect movement of the rotors. The rotors are formed as toothed wheels, and the detecting element includes an electromagnetic spool with a core, wherein the displacement of the individual teeth of the toothed wheel on the spool generates electric pulses. Such an arrangement is disclosed, for example, in the German patent No. 1,576,334. This arrangement is relatively expensive, is characterized by considerable wear, and thereby is suceptible to malfunction.

SUMMARY OF THE INVENTION

Accordingly, it is an object of the present invention to provide a fuel injection arrangement which avoids the disadvantages of the prior art.

More particularly, it is an object of the present invention to provide a fuel injection arrangement which has a very simple construction and at the same time operates very accurately, in other words it supplies a fuel in quantities which exactly correspond to the respective requirements.

It is another object of the present invention to provide a fuel injection arrangement which, because of its simple construction, is less susceptible to malfunction than the known fuel injection arrangements.

In keeping with these objects, and with others which will become apparent hereinafter, one feature of the present invention resides, briefly stated, in a fuel injection arrangement in which measuring means is formed as a quartz pressure measuring diaphragm with which an electrical signal is produced by a piezoelectric effect on quartz because of the differential pressure on the measuring diaphragm.

When the fuel injection arrangement is designed in accordance with the present invention, it has a simple construction, is characterized by lower wear, is less susceptible to malfunction, and less expensive.

In accordance with another advantageous feature of the present invention, an additional quartz body which is similar to the quartz pressure measuring diaphragm is arranged in the immediate vicinity of the latter so as to eliminate acceleration caused by the measuring diaphragm. When both quartz bodies have identical masses, a compensation of disturbing acceleration voltage can be provided by electrical connection in series.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
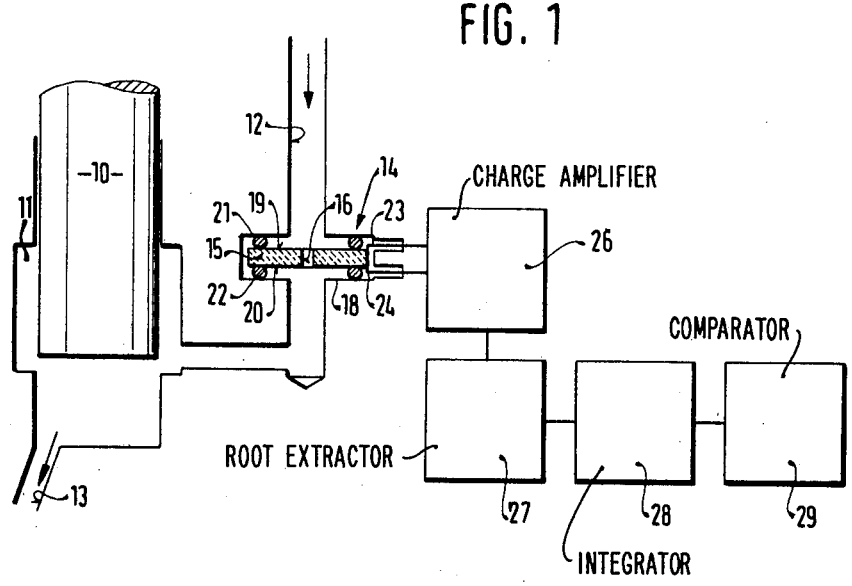
FIG. 1 is a schematic view showing a fuel injection arrangement in acordance with the present invention.
Figure 2:
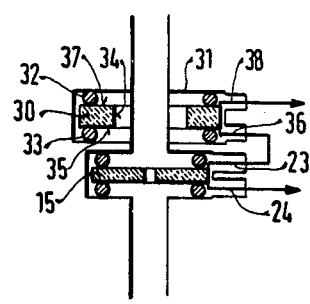
FIG. 2 is a view showing a measuring element of the inventive fuel injection arrangement in accordance with another embodiment of the invention.

A fuel injection arrangement shown in FIG. 1 has a pump piston 10 which sealingly slides in a cylinder 11. It activates a fuel from a supply conduit 12 and supplies the same into a conduit 13 to a not shown injection nozzle.

A measuring element 14 is arranged in the supply conduit 12 and serves for measuring a quantity of the fuel supplied to the injection nozzle. The fuel injection arrangement can be formed, for example, as a pump nozzle arranged on a cylinder head of an internal combustion engine.

The measuring element includes a disk-shaped monocrystal quartz plate or lamella 15 with a central cylindrical throttling opening 16. The quartz plate is arranged in a cylindrical housing 18 provided in the supply conduit 12. Both end faces 19 and 20 of the quartz plate 15 are sealed outwardly at their outer edges by sealing rings 21 and 22. The sealing rings 21 and 22 prevent overflow of the quartz plate around its outer edge.

The central throttling opening 16 acts similarly to a standard measuring orifice diaphragm for determination of the fuel quantity which flows through the conduit. The throttling opening 16 of the quartz plate 15 has an identical diameter over its entire length, inasmuch as it must be utilized as a measuring diaphragm for short time forward flow and return flow.

Metallic electrodes 23 and 24 are formed on each end face 19 and 20 of the quartz plate 15, for example by an evaporative process. The differential pressure generated during the flowing of the fuel through the throttling opening 16 acts upon both end faces of the quartz plate with different pressures. The thus produced piezoelectric effect provides for displacement of quartz charge in the monocrystal, and a small electric voltage is generated on the metallic electrodes, to approximately 1 volt. The electric voltage is supplied by an insulated tight branch through a charge amplifier 26 and is amplified in its power. The charge amplifier is readjustable so that a new adjustment to a zero position is possible during the current pauses. The electrical voltage produced at the outlet of the charge amplifier depends in accordance with a square law on the fuel throughflow speed.

In order to obtain an electrical voltage which is proportional to the throughflow speed, an electric root-extracting device 27 is connected further with the charge amplifier 26. In the event of negative electrical voltage, i.e. in the event of return flow to the fuel during the supply stroke, the root-taking device provides for a corresponding negative voltage.

The total fuel aspirated during the forwards stroke and a return stroke of the piston 10 is obtained by integration of the voltage obtained from the root-taking device 27 over time. This step is taken in an electronic integrating device 28 in accordance with the equation $$Q_{asp.} = \text{const.} \int_0^{n/60} \frac{U_{quartz}}{\sqrt{U_{quartz}}} dt$$

The voltage after the integrating device 28 is a measure of the fuel quantity which has flowed through the quartz plate. After the comparison with the nominal value in an electric comparing device 29 and performing an adjustment of the injected quantity, if necessary, the integrating device 28 is readjusted back to zero. Thus, the initial position for measuring of the fuel quantity during the next injection step is attained.

Since the quartz plate 15 together with the pump nozzle is arranged on the cylinder head of the internal combustion engine, an acceleration takes place. When the acceleration components occur in the throughflow direction of the quartz plate 15, then the thus produced acceleration force causes electrical disturbances of the metallic electrodes. For avoiding these disturbing influences, and thereby increasing the accuracy of the quartz pressure measuring diaphragm, a similarly formed quartz body 30 or compensation quartz is arranged in the immediate vicinity of the measuring element 14 so that it is subjected to identical acceleration.

The quartz body 30 is arranged together with the measuring element 14 in a cylindrical housing 31 and clamped by rubber rings 32 and 33. However, it does not have a measuring orifice, but instead has a relatively great central opening 34. A metallic electrode 36 is provided on a lower end face 35 of the quartz body and connected with the metallic electrode 23 of the quartz plate 15. A metallic electrode 38 is arranged on an end face 37 of the quartz body 30 and leads, together with the metallic electrode 24 of the quartz plate 15, to the charge amplifier 26.

When the two quartz bodies 15 and 30 have identical masses, then the above described electrical connection in series provides for a compensation of the disturbing acceleration voltage. In the event of a parallel connection, there is attained a compensation by charge equalization, with given matching polarity connection.

Figure 3:
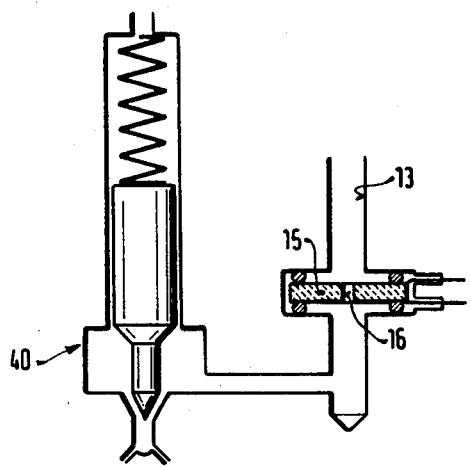
FIG. 3 is a view showing a fuel injection arrangement in accordance with a further embodiment of the invention.

As can be seen from FIG. 3, it is advantageous when the quartz pressure measuring diaphragm 15 with the central measuring opening 16 is arranged in the injection conduit 13, immediately prior to an injection nozzle 40 of a conventional construction. The nozzle 40 is a nozzle of an injection pump, particularly a distributing injection pump. It is not described in detail inasmuch as it is known in the art.

It will be understood that each of the elements described above, or two or more together, may also find a useful application in other types of constructions differing from the types described above.

While the invention has been illustrated and described as embodied in a fuel injection arrangement for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. A fuel injection control arrangement for an internal combustion engine, comprising means for receiving an electrical signal corresponding to a quantity of a supplied fuel, comparing an actual value with a nominal value of the supplied fuel quantity, and producing a correcting signal for fuel supply; and means for measuring the quantity of a supplied fuel and producing the corresponding electrical signal, said measuring means including a quartz pressure measuring diaphragm producing the corresponding electric signal by a piezoelectric effect on quartz because of a differential pressure on said measuring diaphragm, said quartz pressure measuring diaphragm including a monocrystal quartz plate with a diaphragm opening of an identical diameter over its entire length and with two outer surfaces exposed to the differential pressure, and electrode means provided on said outer surfaces.

2. A fuel injection control arrangement as defined in claim 1, wherein said electrode means are metallic electrodes arranged on said outer surfaces of said quartz plate of said quartz measuring diaphragm.

3. A fuel injection control arrangement as defined in claim 2; and further comprising means for compensating fuel acceleration causes by said measuring diaphragm and including a compensating quartz having a mass identical to that of said quartz plate of said measuring diaphragm and two outer surfaces, and further electrodes arranged on said outer surfaces of said compensating quartz.

4. A fuel injection control arrangement as defined in claim 3, wherein said receiving, comparing and producing means includes an electric amplifying element arranged to receive said electrical signal from said measuring means, a root-taking element connected to said amplifying element, an integrating element connected to said root-taking element and a comparing element connected to said integrating element for comparing the actual and nominal values of the supplied fuel quantity and together forming parts of an electronic control device, said electrodes of said quartz plate and said compensating quartz including proximal electrodes connected with one another and distal electrodes connected with said amplifier.

5. A fuel injection control arrangement as defined in claim 1, wherein said receiving, comparing and producing means includes an electric amplifying element arranged to receive said electrical signal from said measuring means, a root-taking element connected to said amplifying element, an integrating element connected to said root-taking element and a comparing element connected to said integrating element for comparing the actual and nominal values of the supplied fuel quantity and together forming parts of an electronic control device.

6. A fuel injection control arrangement as defined in claim 5, wherein said electric amplifying element and said integrating element are readjustable.

7. A fuel injection control arrangement as defined in claim 1; and further comprising means for preventing fuel overflow not through said diaphragm opening of said quartz plate of said measuring diaphragm.

8. A fuel injection control arrangement as defined in claim 7, wherein said preventing means includes sealing rings arranged on said quartz plate of said measuring diaphragm.

9. A fuel injection control arrangement as defined in claim 8; and further comprising a housing accommodating said measuring diaphragm, said sealing rings being arranged between each of said outer surfaces of said quartz plate and said housing.

10. A fuel injection control arrangement as defined in claim 1; and further comprising an injection nozzle of an injection pump, said quartz pressure measuring diaphragm being arranged prior to said injection nozzle of said injection pump.

11. A fuel injection control arrangement as defined in claim 10, wherein said injection pump is a distributing injection pump provided with said injection nozzle, said quartz pressure measuring diaphragm being arranged prior to said injection nozzle of said distributing injection pump.

12. A fuel injection control arrangement as defined in claim 1; and further comprising an injection pump having a high pressure supply piston and a supply conduit leading to the latter, said quartz pressure measuring diaphragm being arranged in said supply conduit.

* * * * *